(12) United States Patent
Benson et al.

(10) Patent No.: US 12,270,770 B2
(45) Date of Patent: Apr. 8, 2025

(54) SYSTEMS AND METHODS FOR MONITORING FEATURE SIZES IN DIGITAL X-RAY IMAGING

(71) Applicant: QSA Global Inc., Burlington, MA (US)

(72) Inventors: Paul Benson, Waltham, MA (US); Jason William Bourn, Stratham, NH (US)

(73) Assignee: QSA Global Inc., Burlington, MA (US)

( * ) Notice: Subject to any disclaimer, the term of this patent is extended or adjusted under 35 U.S.C. 154(b) by 315 days.

(21) Appl. No.: 17/875,945

(22) Filed: Jul. 28, 2022

(65) Prior Publication Data

US 2023/0034628 A1  Feb. 2, 2023

Related U.S. Application Data

(60) Provisional application No. 63/227,714, filed on Jul. 30, 2021.

(51) Int. Cl.
*G01N 23/18* (2018.01)
*G01N 23/04* (2018.01)
*G01N 23/083* (2018.01)

(52) U.S. Cl.
CPC .......... *G01N 23/18* (2013.01); *G01N 23/04* (2013.01); *G01N 23/083* (2013.01); *G01N 2223/401* (2013.01)

(58) Field of Classification Search
CPC ...... G01N 23/18; G01N 23/04; G01N 23/083; G01N 2223/401; G01N 17/008; G01N 2223/628
See application file for complete search history.

(56) References Cited

U.S. PATENT DOCUMENTS

2009/0086887 A1\* 4/2009 Kito .................. A61B 6/588
378/19
2018/0031714 A1\* 2/2018 Tajima .................. H04N 23/50
(Continued)

FOREIGN PATENT DOCUMENTS

CN  110231353  9/2019
WO  2012174265  12/2012

OTHER PUBLICATIONS

Int'l Search Report and Written Opinion Appln No. PCT/US2022/038823 mailed Oct. 17, 2022.

*Primary Examiner* — Edwin C Gunberg
*Assistant Examiner* — Richard O Toohey
(74) *Attorney, Agent, or Firm* — McAndrews, Held & Malloy, Ltd.

(57) ABSTRACT

An example portable radiography scanning system includes: a radiation detector configured to generate a digital image based on incident radiation; a radiation emitter configured to output the radiation; a frame configured to hold the radiation emitter and/or the detector such that the emitter directs the radiation to the detector; a first sensor configured to determine a first distance between the detector and emitter; and a computing device configured to: determine a second distance between the emitter and an interface between the radiation and the object; determine a magnification correction factor based on the first and second distances; measure a size, in pixels, of a feature of the object in the image; and: calculate an actual size of the feature based on the magnification correction factor and the measured size, and/or determine whether the measured size of the feature satisfies a threshold size based on the magnification correction factor.

19 Claims, 14 Drawing Sheets

(56) References Cited

U.S. PATENT DOCUMENTS

2018/0299389 A1* 10/2018 Kaneko .................. G01N 23/18
2019/0139244 A1*  5/2019 Pras ......................... G06T 7/55
2019/0239834 A1   8/2019 Benson
2021/0190705 A1   6/2021 May

* cited by examiner

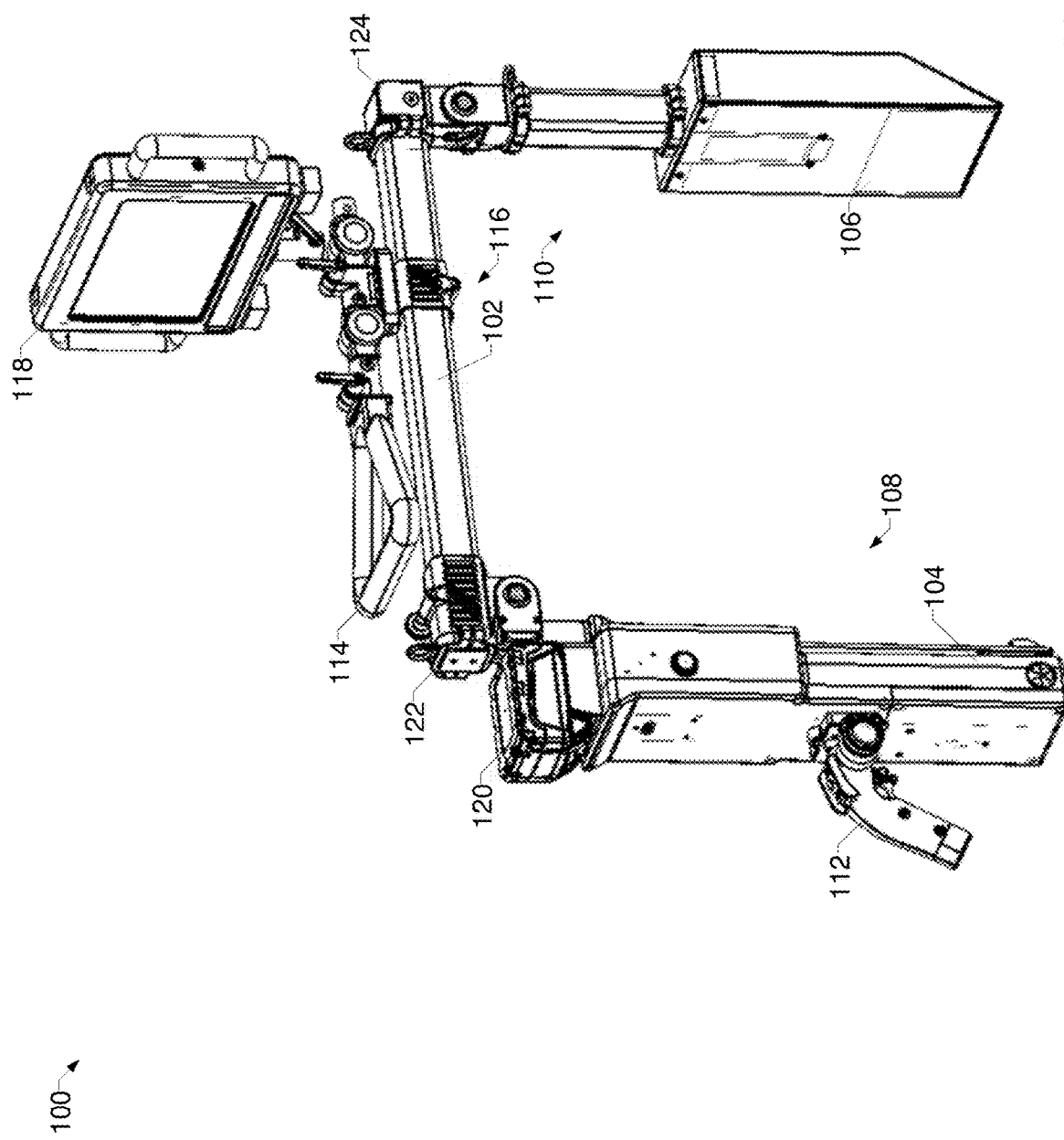

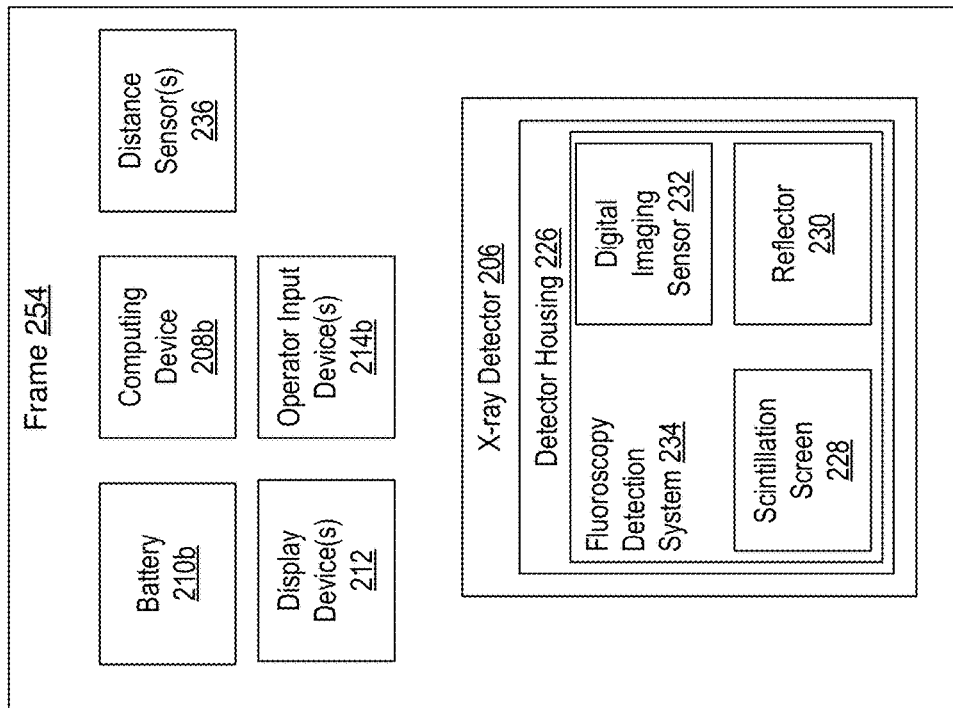
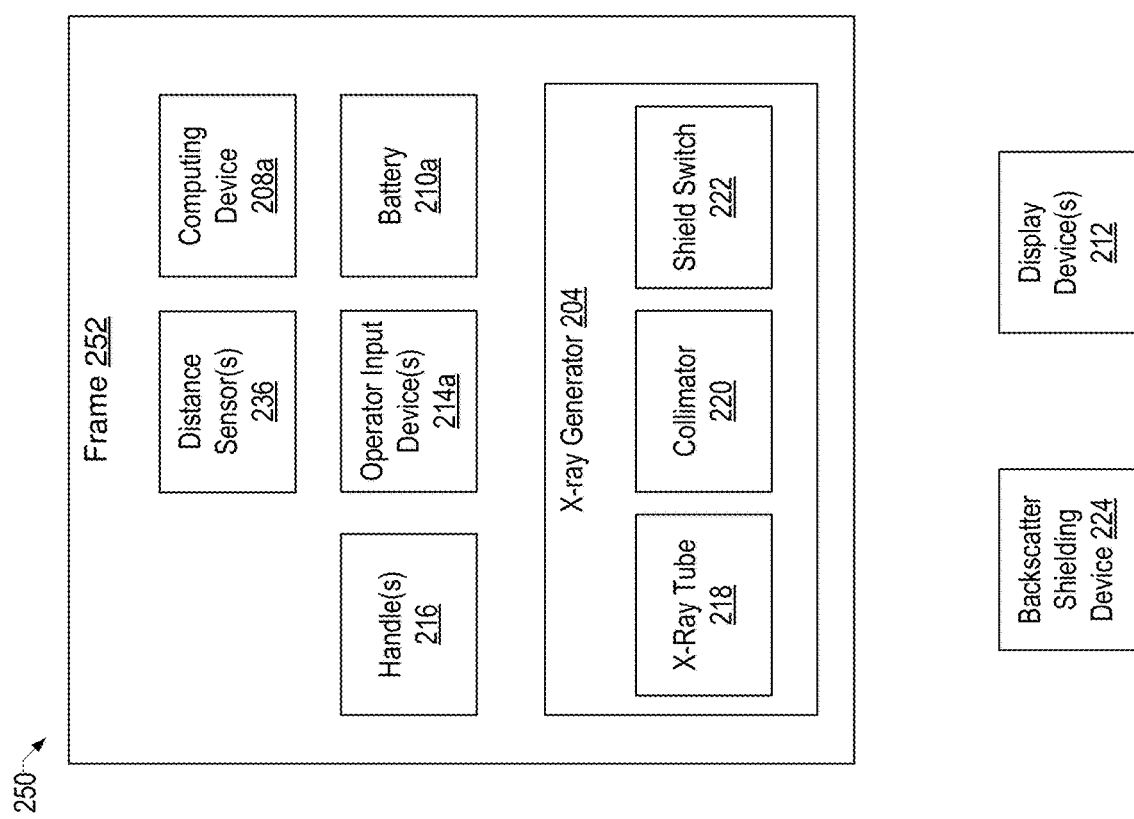
FIG. 2B

SYSTEMS AND METHODS FOR MONITORING FEATURE SIZES IN DIGITAL X-RAY IMAGING

BACKGROUND

This disclosure relates generally to radiography and, more particularly, to systems and methods for monitoring feature sizes in digital X-ray imaging.

SUMMARY

Systems and methods for combining monitoring feature sizes in digital X-ray imaging are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a perspective view of an example handheld X-ray imaging system to generate and output digital images and/or video based on incident X-rays, in accordance with aspects of this disclosure.

FIG. 2B illustrates another example digital X-ray imaging system having multiple frame sections.

The figures are not necessarily to scale. Wherever appropriate, similar or identical reference numerals are used to refer to similar or identical components.

DETAILED DESCRIPTION

Figure 2A:
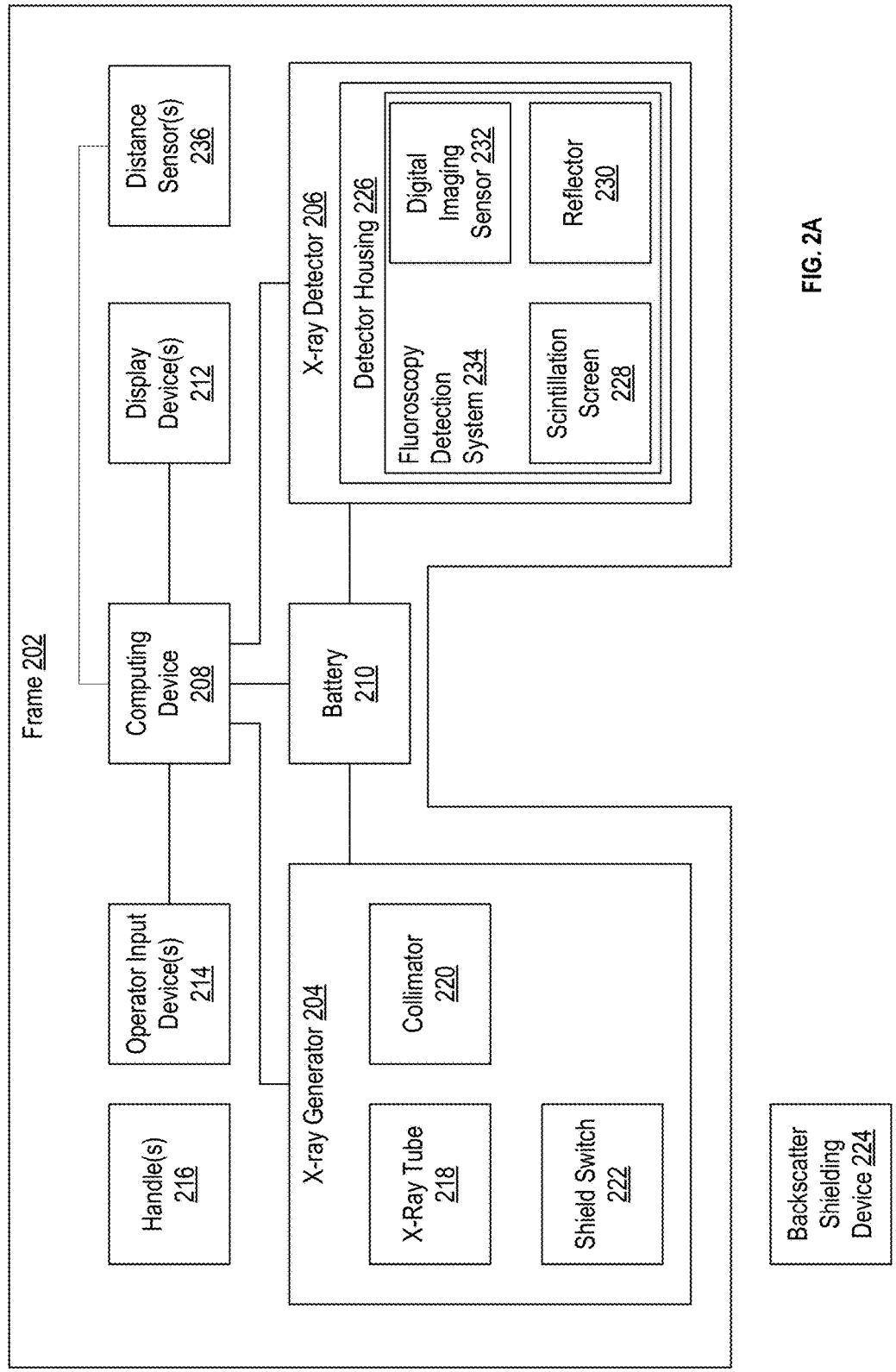
FIG. 2A is a block diagram of the example handheld X-ray imaging system of FIG. 1.

Disclosed example systems and methods provide for aiding handheld X-ray scanning operators with evaluation of features present in X-ray images. Disclosed systems and methods may be useful for, for example, aiding in or performing automated detection of corrosion under insulation (CUI) when utilizing an ionizing radiation source and a digital detection system.

Conventional radiography scanning processes rely on operator interpretation of video and/or still images to determine whether features of interest are present in the video or images. Disclosed example systems and methods may be used to automate the detection process, and provide discrete feedback to the operator and/or provide quantified data to guide the determination of CUI. Disclosed systems and methods account for variables such as pipe size, insulation thickness, radiation source-to-radiation imager distance, and radiation source-to-pipe distance, to automatically detect actual image feature sizes and/or compare image feature sizes to size thresholds.

Disclosed systems and methods use a digital X-ray imaging system to perform measurement processes and machine vision detection to perform size measurements. These measurement processes and machine vision detection generate size determinations, which can then be used to analyze items such as CUI measurements, analyze CUI trends, pass/fail determinations within boundary limits, identify areas of concerns, and/or provide other automated analysis.

To perform the measurement and analysis processes, disclosed systems and methods perform measurements and calculations to determine a magnification effect of the radiation on the resulting digital image, which may be performed by disclosed systems and methods in real-time or near real-time to improve usability for an operator during a scanning process. Disclosed example systems and methods use combinations of sensors, operator input, and/or lookup tables to determine a magnification correction factor in real-time, as well as monitor changes to the magnification correction factor based on movement of the radiation emitter and radiation detector, and which may then be used to analyze the real-time digital X-ray images.

Disclosed example systems and methods may be advantageously used to improve, automate, and/or guide decision making on CUI inspections and/or other applications, including providing real-time feedback on actual corrosion measurements. Such real-time feedback can reduce the reliance on operator expertise, reduce the likelihood of erroneous identifications (e.g., false positives and/or false negatives), and improve the probability of detection on inspected objects or areas. By improving the probability of detection, disclosed systems and methods can help reduce costs associated with maintenance and/or repair of inspected objects, and/or enable an improved inspection speed, thereby reducing inspection costs.

Disclosed example systems and methods may be implemented on a handheld frame (e.g., a C-frame or other arrangement), on a lift or other movable framework, on one or more robotic manipulators (e.g., pipe bugs, or motorized, wheeled buggies that move along a pipe or other structure), on one or more "drones" (e.g., quadcopters or other automatic or manually controlled flying devices), and/or any other mechanisms for holding the components of the digital X-ray scanning system in the desired arrangement for scanning.

As used herein, the term "real-time" refers to the actual time elapsed in the performance of a computation by a computing device, the result of the computation being required for the continuation of a physical process (i.e., no significant delays are introduced). For example, real-time display of captured images includes processing captured image data and displaying the resulting output images to create the perception to a user that the images are displayed immediately upon capture. As used herein, the term "portable" includes handheld (e.g., capable of being carried and operated by a single person) and/or wheeled (e.g., capable of being transported and operated while wheels are attached and/or placed on wheels).

While example systems and methods are disclosed below with reference to X-rays, the disclosure is similarly applicable to other electromagnetic energy ranges. For example, other X-ray energies, gamma rays, and/or any other types of electromagnetic radiation may be used based on the application and using with the appropriate personnel techniques and/or equipment.

Disclosed example portable radiography scanning systems include: a radiation detector configured to generate a digital image based on incident radiation; a radiation emitter configured to output the radiation; a frame configured to hold at least one of the radiation emitter or the radiation detector such that the radiation emitter directs the radiation to the radiation detector; a first sensor configured to determine a first distance between the radiation detector and the radiation emitter; and a computing device configured to: determine a second distance between the radiation emitter and an interface between the radiation and the object; determine a magnification correction factor based on the first distance and the second distance; measure a size, in pixels, of a feature of the object in the digital image; and at least one of: calculate an actual size of the feature based on the magnification correction factor and the measured size of the feature, or determine whether the measured size of the feature satisfies a threshold size based on the magnification correction factor.

Some example portable radiography scanning systems further include a display configured to display the digital image. In some example portable radiography scanning systems, the computing device is configured to control the display to overlay an indication of the measured feature in the digital image and the calculated actual size of the feature over the digital image on the display. In some example portable radiography scanning systems, the computing device is configured to control the display to display an indication of whether the calculated actual size of the feature satisfies a threshold. In some such systems, the threshold size is input by an operator.

In some example portable radiography scanning systems, the computing device is configured to output a notification in response to determining that the size of the feature satisfies the threshold size. In some examples, the computing device is configured to, in response to determining that the size of the feature satisfies the threshold size, store location information at which the digital image was captured in association with the digital image. In some example portable radiography scanning systems, the computing device is configured to calculate and overlay a nominal image of the object on the display over the digital image.

In some example portable radiography scanning systems, the first sensor includes at least one of a laser distance sensor, an ultrasonic distance sensor, or a light detection and ranging (LIDAR) sensor. In some example portable radiography scanning systems, the computing device is configured to determine the second distance by accessing a lookup table based on at least one dimension of the object. In some example portable radiography scanning systems, the frame holds the radiation detector on a first section of the frame and holds the radiation emitter on a second section of the frame. In some example portable radiography scanning systems, a center section of the frame is adjustable to adjust a distance between the first section of the frame and the second section of the frame based on the size of the object, so as to adjust a distance between the radiation detector and the radiation emitter.

In some example portable radiography scanning systems, the computing device is configured to perform a computer analysis of the digital image, based on the magnification correction factor and the measured size of the feature, to determine whether the feature is indicative of a flaw in the object. In some example portable radiography scanning systems, the computing device is configured to receive an input identifying the feature to be measured in the digital image.

In some example portable radiography scanning systems, the computing device is configured to determine the second distance by: measuring a third distance between the radiation emitter and a first location on an outer surface of the object via a second sensor; measuring a fourth distance between the radiation emitter and a second location on the outer surface of the object via a third sensor; and determining the second distance based on the third distance and the fourth distance. In some example portable radiography scanning systems, the computing device is configured to: update the second distance based on changes in at least one of the third distance or the fourth distance; and update the magnification correction factor based on the updated second distance.

Disclosed example methods to calculate a dimension of a feature of an object scanned via an X-ray image involve: positioning an X-ray detector on a first side of an object to be scanned; positioning an X-ray tube on a second side of the object such that the X-ray tube directs X-ray radiation at the X-ray detector through the object; measuring, via a first sensor, a first distance between the X-ray detector and the X-ray tube; determining a second distance between the X-ray emitter and an interface between the X-ray radiation and the object; determining a magnification correction factor based on the first distance and the second distance; capturing, via the X-ray detector, a digital X-ray image of the object; measuring a size, in pixels, of a feature of the object in the digital X-ray image; and at least one of: calculating an actual size of the feature based on the magnification correction factor and the measured size of the feature, or determining whether the measured sized of the feature satisfies a threshold size based on the magnification correction factor.

Some example methods further involve displaying the digital X-ray image on a display. Some example methods further involve overlaying the digital X-ray image on the display with an indication of the measured feature in the digital X-ray image and the calculated actual size of the feature. Some example methods further involve displaying an indication of whether the calculated actual size of the feature satisfies the threshold size.

FIG. 1 is a perspective view of an example handheld X-ray imaging system 100 to generate and output digital images and/or video based on incident X-rays. The example handheld X-ray imaging system 100 may be used to perform non-destructive testing (NDT), medical scanning, security scanning, and/or any other scanning application.

The system 100 of FIG. 1 includes a frame 102 that holds an X-ray generator 104 and an X-ray detector 106. In the example of FIG. 1, the frame 102 is C-shaped, such that the X-ray generator 104 directs X-ray radiation toward the X-ray detector 106. As described in more detail below, the frame 102 is positionable (e.g., held by an operator, supported by an external support structure and/or manipulated by the operator, etc.) around an object to be scanned with X-rays. The example frame 102 is constructed using carbon fiber and/or machined aluminum.

The X-ray generator 104 is located on a first section 108 of the C-shaped frame 102 generates and outputs X-ray radiation, which traverses and/or scatters based on the state of the object under test. The X-ray detector 106 is located on a second section 110 of the frame 102 (e.g., opposite the first section 108) and receives incident radiation generated by the X-ray generator 104.

The example frame 102 may be manipulated using one or more handles 112, 114. A first one of the handles 112 is an operator control handle, and enables an operator to both mechanically manipulate the frame 102 and control the operation of the handheld X-ray imaging system 100. A second one of the handles 114 is adjustable and may be secured to provide the operator with leverage to manipulate the frame 102. The example handle 114 may be oriented with multiple degrees of freedom and/or adjusted along a length of a central section 116 of the frame 102.

During operation, the handheld X-ray imaging system 100 generates digital images (e.g., digital video and/or digital still images) from the X-ray radiation. The handheld X-ray imaging system 100 may store the digital images on one or more storage devices, display the digital images on a display device 118, and/or transmit the digital images to a remote receiver. The example display device 118 is attachable to the example frame 102 and/or may be oriented for viewing by the operator. The display device 118 may also be detached from the frame 102. When detached, the display device 118 receives the digital images (e.g., still images and/or video) via a wireless data connection. When attached, the display device 118 may receive the digital images via a wired connection and/or a wireless connection.

A power supply 120, such as a detachable battery, is attached to the frame 102 and provides power to the X-ray generator 104, the X-ray detector 106, and/or other circuitry of the handheld X-ray imaging system 100. An example power supply 120 that may be used is a lithium-ion battery pack. The display device 118 may receive power from the power supply 120 and/or from another power source such as an internal battery of the display device 118.

The example central section 116 of the frame 102 is coupled to the first section 108 via a joint 122 and to the second section 110 via a joint 124. The example joints 122, 124 are hollow to facilitate routing of cabling between the sections 108, 110, 116. The joints 122, 124 enable the first section 108 and the second section 110 to be folded toward the center section to further improve the compactness of the handheld X-ray imaging system 100 when not in use (e.g., during storage and/or travel).

FIG. 2A is a block diagram of an example digital X-ray imaging system 200 that may be used to implement the handheld X-ray imaging system 100 of FIG. 1. The example digital X-ray imaging system 200 of FIG. 2A includes a frame 202 holding an X-ray generator 204, an X-ray detector 206, a computing device 208, a battery 210, one or more display device(s) 212, one or more operator input device(s) 214, and one or more handle(s) 216.

The X-ray generator 204 includes an X-ray tube 218, a collimator 220, and a shield switch 222. The X-ray tube 218 generates X-rays when energized. In some examples, the X-ray tube 218 operates at voltages between 40 kV and 120 kV. In combination with a shielding device, X-ray tube voltages between 70 kV and 120 kV may be used while staying within acceptable X-ray dosage limits for the operator. Other voltage ranges may also be used.

The collimator 220 filters the X-ray radiation output by the X-ray tube 218 to more narrowly direct the X-ray radiation at the X-ray detector 206 and any intervening objects. The collimator 220 reduces the X-ray dose to the operator of the system 200, reduces undesired X-ray energies to the detector 206 resulting from X-ray scattering, and/or improves the resulting digital image generated at the X-ray detector 206.

The shield switch 222 selectively enables and/or disables the X-ray tube 218 based on whether a backscatter shielding device 224 is attached to the frame. The backscatter shielding device 224 reduces the dose to the operator holding the frame 202 by providing shielding between the collimator 220 and an object under test. The example backscatter shielding device 224 includes a switch trigger configured to trigger the shield switch 222 when properly installed. For example, the shield switch 222 may be a reed switch or similar magnetically-triggered switch, and the backscatter shielding device 224 includes a magnet. The reed switch and magnet are respectively positioned on the frame 202 and the backscatter shielding device 224 such that the magnet triggers the reed switch when the backscatter shielding device 224 is attached to the frame 202. The shield switch 222 may include any type of a capacitive sensor, an inductive sensor, a magnetic sensor, an optical sensor, and/or any other type of proximity sensor.

The shield switch 222 is configured to disable the X-ray tube 218 when the backscatter shielding device 224 is not installed. The shield switch 222 may be implemented using, for example, hardware circuitry and/or via software executed by the computing device 208. In some examples, the computing device 208 may selectively override the shield switch 222 to permit operation of the X-ray tube 218 when the backscatter shielding device 224 is not installed. The override may be controlled by an administrator or other authorized user.

The X-ray detector 206 of FIG. 2A generates digital images based on incident X-ray radiation (e.g., generated by the X-ray tube 218 and directed toward the X-ray detector 206 by the collimator 220). The example X-ray detector 206 includes a detector housing 226, which holds a scintillation screen 228, a reflector 230, and a digital imaging sensor 232. The scintillation screen 228, the reflector 230, and the digital imaging sensor 232 are components of a fluoroscopy detection system 234. The example fluoroscopy detection system 234 is configured so that the digital imaging sensor 232 (e.g., a camera, a sensor chip, etc.) receives the image indirectly via the scintillation screen 228 and the reflector 230. In other examples, the fluoroscopy detection system 234 includes a sensor panel (e.g., a CCD panel, a CMOS panel, etc.) configured to receive the X-rays directly, and to generate the digital images. An example implementation of the X-ray detector 206 is described below with reference to FIGS. 5-8.

In some other examples, the scintillation screen 228, may be replaced with a solid state panel that is coupled to the scintillation screen 228 and has pixels that correspond to portions of the scintillation screen 228. Example solid state panels may include CMOS X-ray panels and/or CCD X-ray panels.

The computing device 208 controls the X-ray tube 218, receives digital images from the X-ray detector 206 (e.g., from the digital imaging sensor 232) and outputs the digital images to the display device 212. Additionally or alternatively, the computing device 208 may store digital images to a storage device. The computing device 208 may output the digital images as digital video to aid in real-time non-destructive testing and/or store digital still images.

As mentioned above, the computing device 208 may provide the digital images to the display device(s) 212 via a wired connection or a wireless connection. To this end, the computing device 208 includes wireless communication circuitry. For example, the display device(s) 212 may be detachable from the frame 202 and held separately from the frame 202 while the computing device 208 wirelessly transmits the digital images to the display device(s) 212. Additionally or alternatively, the display device(s) 212 may be implemented using a separate display or computing device. The display device(s) 212 may include a smartphone, a tablet computer, a laptop computer, a wireless monitoring device, and/or any other type of display device equipped with wired and/or wireless communications circuitry to communicate with (e.g., receive digital images from) the computing device 208.

The example display device(s) 212 display the X-ray images with the thermal and/or optical images on a display device in real-time (e.g., as the images are generated). In some examples, the display device(s) 212 display a first feed (e.g., the X-ray feed of X-ray images, the thermal feed of thermal images, or the optical feed of optical images) as primary images having a first (e.g., largest) size, and display a second feed (e.g., another of the X-ray feed of X-ray images, the thermal feed of thermal images, or the optical feed of optical images) as secondary images having a second (e.g., smaller) size. For example, the primary images may be the main display shown on the display device(s) 212, with the secondary images shown in or near a corner of the main display so as to limit obstruction of the main display. In some such examples, the display device(s) 212 further display another secondary feed (e.g., having the same size as the other secondary feed) or a tertiary feed (e.g., having an even smaller size than the secondary feed). In some examples, the two or three feeds have equivalent sizes on the display device(s) 212. The operator may be permitted to select a secondary or tertiary feed to change that feed to be the primary feed, in which case the former primary feed may be relegated to be the secondary or tertiary feed.

In some other examples, the display device(s) 212 may show two or three feeds in an overlapping manner by controlling an opacity of the image(s) in the feeds.

In some examples, the computing device 208 adds data to the digital images to assist in subsequent analysis of the digital images. Example data includes a timestamp, a date stamp, geographic data, or a scanner inclination. The example computing device 208 adds the data to the images by adding metadata to the digital image file(s) and/or by superimposing a visual representation of the data onto a portion of the digital images.

The operator input device(s) 214 enable the operator to configure and/or control the example digital X-ray imaging system 200. For example, the operator input device(s) 214 may provide input to the computing device 208, which controls operation and/or configures the settings of the digital X-ray imaging system 200. Example operator input device(s) 214 include a trigger (e.g., for controlling activation of the X-ray tube 218), buttons, switches, analog joysticks, thumbpads, trackballs, and/or any other type of user input device.

The handle(s) 216 are attached to the frame 202 and enable physical control and manipulation of the frame 202, the X-ray generator 204, and the X-ray detector 206. In some examples, one or more of the operator input device(s) 214 are implemented on the handle(s) 216 to enable a user to both physically manipulate and control operation of the digital X-ray imaging system 200.

The example digital X-ray imaging system 200 further includes one or more sensors 236, which may be used to perform measurements used to calculate sizes of one or more features of the captured digital X-ray images and/or video. Example sensors 236 that may be used include distance sensors configured to determine distances between the X-ray generator 204 and the X-ray detector 206, a distance between the X-ray generator 204 and an exterior surface of an object to be scanned, accelerometers and/or gyroscopes to detect an orientation of the digital X-ray imaging system 200, and/or any other sensors. The sensors 236 may be placed on any appropriate portion of the frame 202 to perform the desired measurements. For example, one or more distance sensors may be placed on a same side of the frame 202 as the X-ray generator 204 to measure distances from the X-ray generator 204 to other objects or locations.

While the example frame 202 includes features to enable the digital X-ray imaging system 200 to be held and manipulated by an operator during output of the X-rays, in other examples the frame 202 includes one or more sections or portions, and/or may be implemented and/or held by one or more robotic device(s), drone aircraft (e.g., quadcopters or other remote-controlled and stable aircraft), and/or other movable support structures. FIG. 2B illustrates another example digital X-ray imaging system 250 having multiple frame sections 252, 254. For example, a first frame section 252 may hold the X-ray generator 204, and the sensor(s) 236, and a second, separate frame section 254 may hold the X-ray detector 206. The frame sections 252, 254 can be separately maneuvered and positioned so that the X-ray radiation is directed from the X-ray generator 204 at the X-ray detector 206 at the time of operation. Additionally, the frame sections 252, 254 may include corresponding power sources (e.g., batteries 210a, 210b), separate computing devices 208a, 208b or other processing and/or communication circuitry, and/or separate operator input device(s) 214a, 214b.

Figure 3:
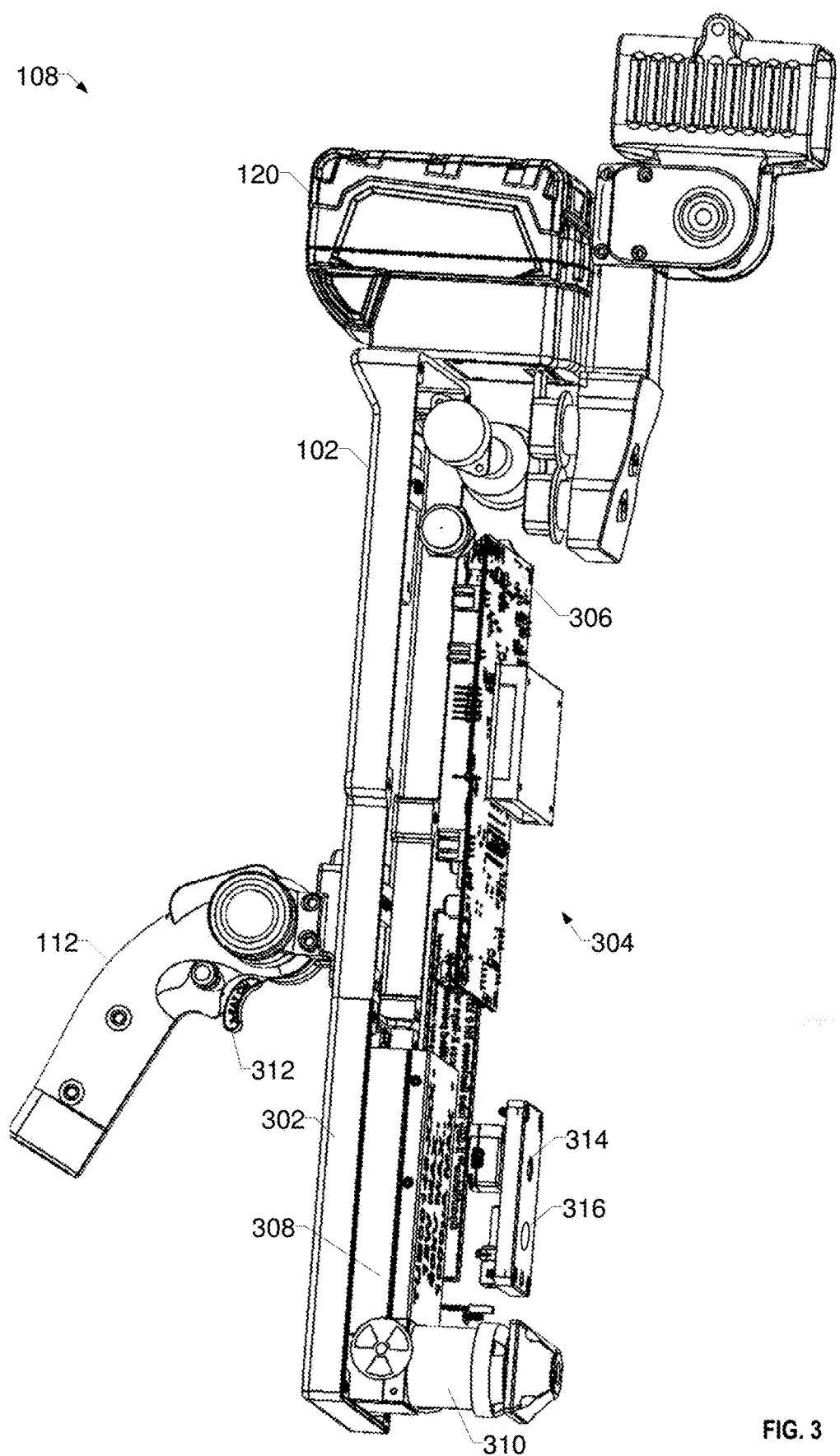
FIG. 3 is a perspective view of a first portion of the handheld X-ray imaging system of FIG. 1, including an X-ray generator, a power supply, an operator control handle.

FIG. 3 is a perspective view of the first portion 108 of the handheld X-ray imaging system 100 of FIG. 1, including the X-ray generator 104, the power supply 120, and the operator control handle 112. FIG. 3 is illustrated with a portion of a housing 302, while a second portion of the housing (shown in FIG. 1) is omitted for visibility of other components.

The example first portion 108 is further coupled to a computing device 304, such as the computing device 208 of FIG. 2A. The computing device 304 is attached to the frame 102 via a printed circuit board 306.

An X-ray tube 308 (e.g., the X-ray tube 218 of FIG. 2A) is coupled to a collimator 310 (e.g., the collimator 220 of FIG. 2A) and controlled by the computing device 304 and/or by an operator input device on the handle 112. As shown in FIG. 3, the handle 112 may include an X-ray trigger 312 (e.g., one of the operator input device(s) 214 of FIG. 2A). When actuated (e.g., by the operator of the handheld X-ray imaging system 100), the X-ray trigger 312 activates the X-ray tube 308 to generate X-ray radiation. The X-ray trigger 312 may activate the X-ray tube 308 directly and/or via the computing device 304.

The collimator 310 filters X-ray radiation generated by the X-ray tube 308 to reduce the X-ray radiation that is not directed at the X-ray detector 106 and/or to increase the proportion of X-ray radiation that is directed at the X-ray detector 106 (e.g., radiation that ends up being incident on a scintillator of the X-ray detector 106) relative to radiation not directed at the X-ray detector 106.

A targeting camera 314 (e.g., the optical sensor(s) 238 of FIG. 2A) is coupled to the computing device 304 to enable an operator of the handheld X-ray imaging system 100 to determine a target of generated X-rays. The example targeting camera 314 generates and outputs digital images (e.g., digital video, digital still images, etc.) to the computing device 304 for display to the operator via the display device 118. The digital images of the target (e.g., an exterior of the target) may be saved in association with the digital images of the X-ray scanning to provide contextual information about the location or object from which digital X-ray images are captured. Additionally or alternatively, a laser may be projected from the location of the targeting camera 314 toward the X-ray detector 106. The laser illuminates an approximate location on a workpiece that is being scanned by the digital X-ray imaging system 100 and/or output to the display device 118.

Figure 4:
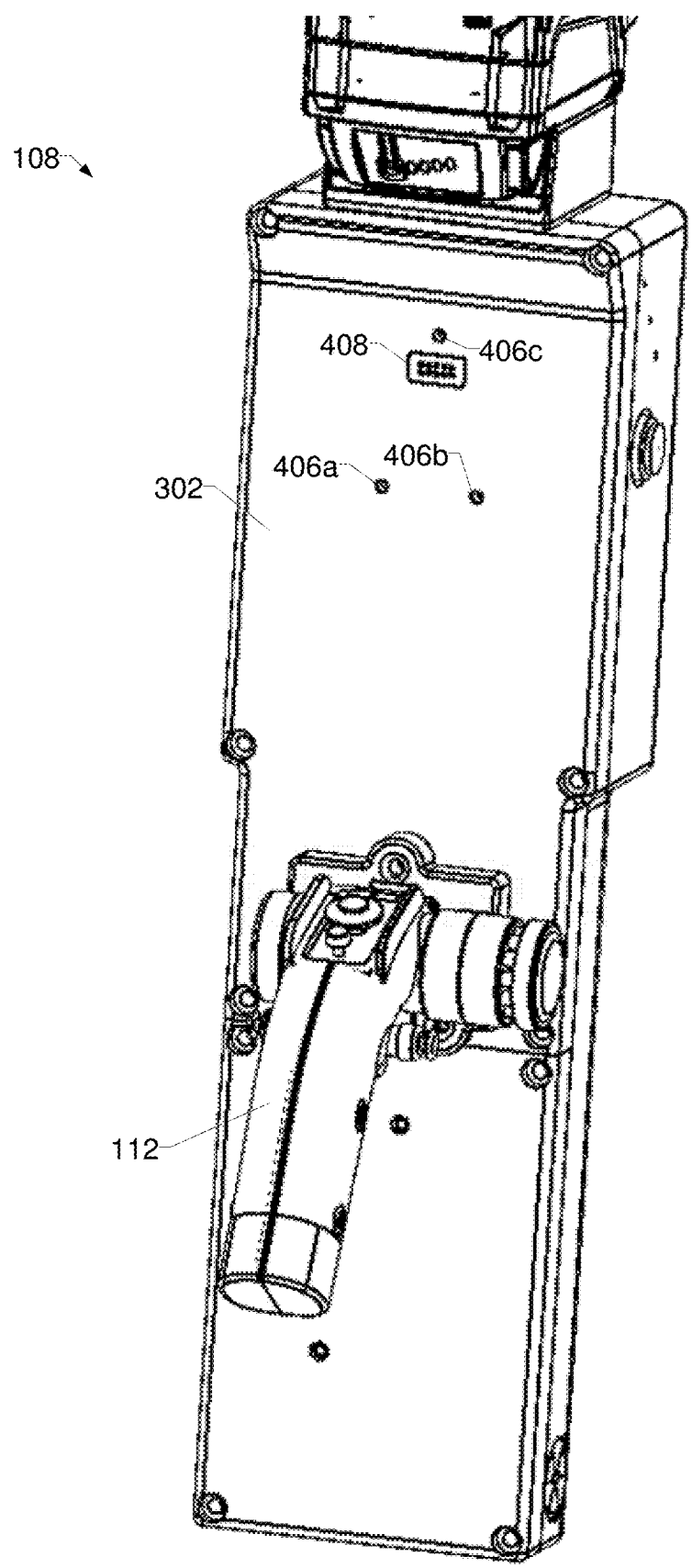
FIG. 4 is a more detailed view of the first portion of the handheld X-ray imaging system of FIG. 3 including the example handle.

FIG. 4 is a more detailed view of the first portion 108 of the handheld X-ray imaging system of FIG. 3 including the example handle 112. To improve the handling of the digital X-ray imaging system 100, the handle 112 is capable of attachment to multiple locations on the frame 102. The handle 112 is illustrated at a first location 402 on the frame 102 in FIG. 4. In the example of FIG. 4, the handle 112 is secured to the housing 302 via multiple screws.

The handle 112 may be detached from the first location 402 and attached at a second location 404. As illustrated in FIG. 4, the second location 404 on the housing 302 includes multiple screw nuts 406a-406c and a data connector 408, which match screw nuts and a data connector at the first location 402. The example handle 112 may be attached to the second location 404 by connecting a corresponding connector on the handle 112 to the data connector 408 and screwing the handle into the screw nuts 406a-406c.

Figure 5A:
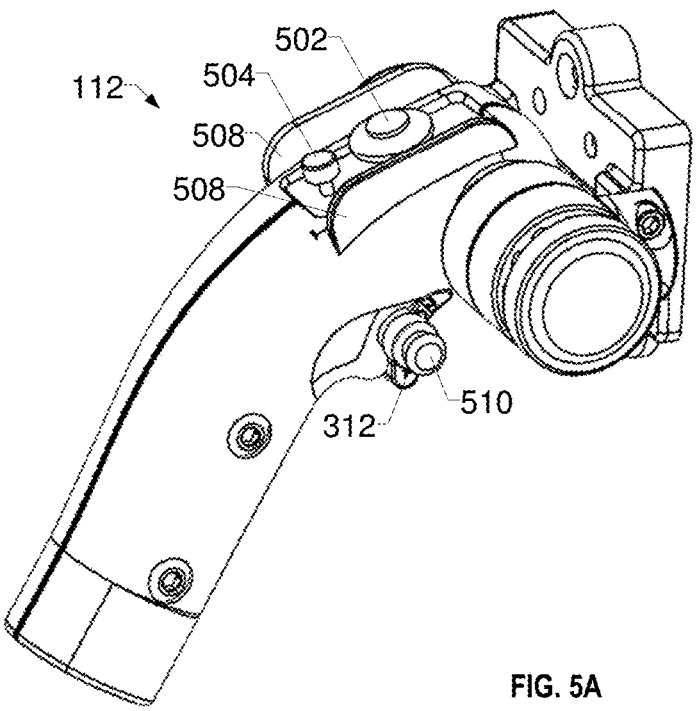
FIGS. 5A and 5B illustrate perspective views of the example handle of FIG. 3.
Figure 5B:
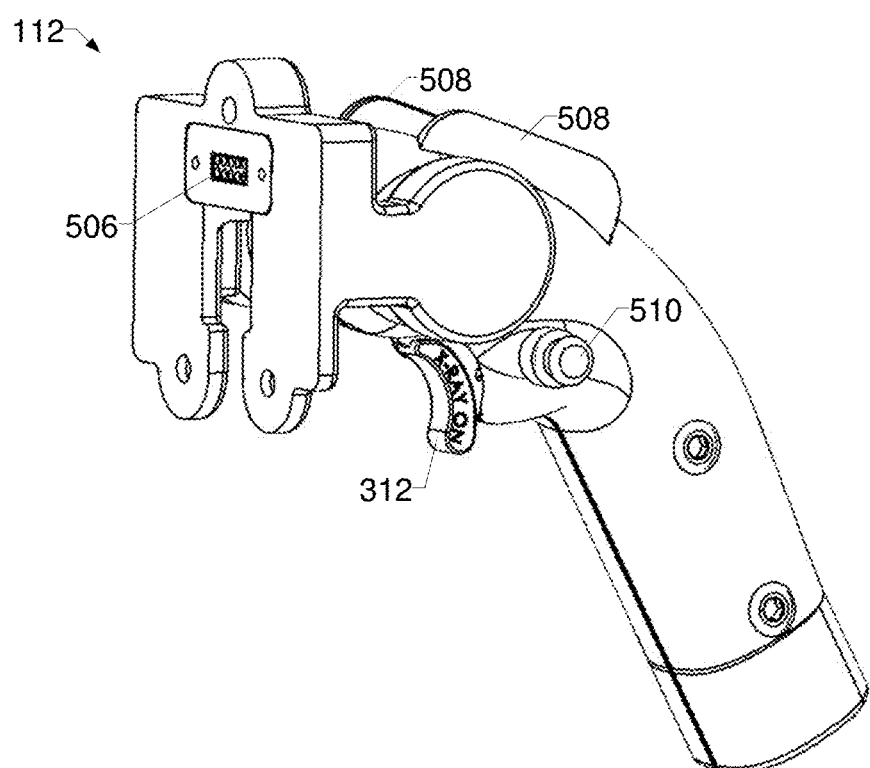

FIGS. 5A and 5B illustrate perspective views of the example handle 112 of FIGS. 1 and 3. As mentioned above, the handle 112 includes the trigger 312, which enables and/or activates the X-ray tube 308 to output the X-ray radiation. The handle 112 includes additional input devices 502, 504 (e.g., operator input devices 214 of FIG. 2A). The input device 502 is a thumbstick, which can be used to input commands to the computing device 304, such as navigating menus, confirming selections, configuring the X-ray tube 308 and/or the X-ray generator 104, changing views and/or any other type of operator input. The input device 504 is a push button that may be used by an operator to confirm and/or cancel a selection. The computing device 304 controls the X-ray tube 308, the X-ray detector 106 (e.g., the X-ray generator 204 and/or the digital imaging sensor 232 of FIG. 2A), the display device 118, and/or any other aspect of the digital X-ray imaging system 100 based on input from the trigger 312, the input devices 502, 504, and/or any other input devices.

The handle 112 includes a data connector 506, which mates to the data connector(s) 408 on the housing 302. The data connectors 408, 506 establish a hard-wired connection between the trigger 312 and/or the input devices 502, 504 and the computing device 304 and/or other circuitry.

The handle 112 includes input guards 508, which protect the input devices 502, 504 from accidental damage. The input guards 508 extend from the handle 112 adjacent the input devices 502, 504 and farther than the input devices 502, 504.

The example handle 112 further includes a trigger lock 510. The trigger lock 510 is a mechanical lock that, when activated, mechanically prevents activation of the trigger 312. The example trigger lock 510 is a push-button safety that locks the trigger 312 against depression by the operator.

Figure 6:
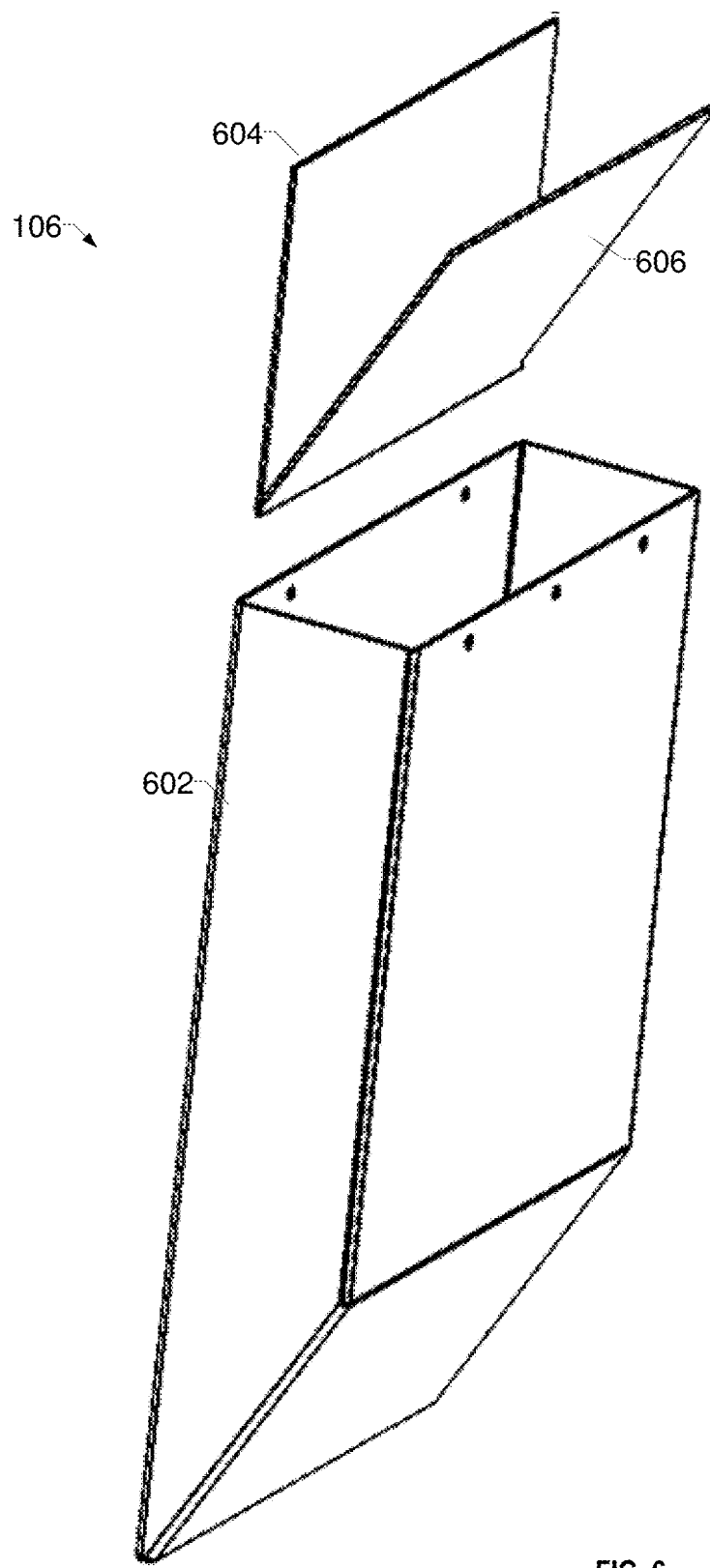
FIG. 6 is a partially exploded view of the example digital X-ray detector of FIG. 1.
Figure 7:
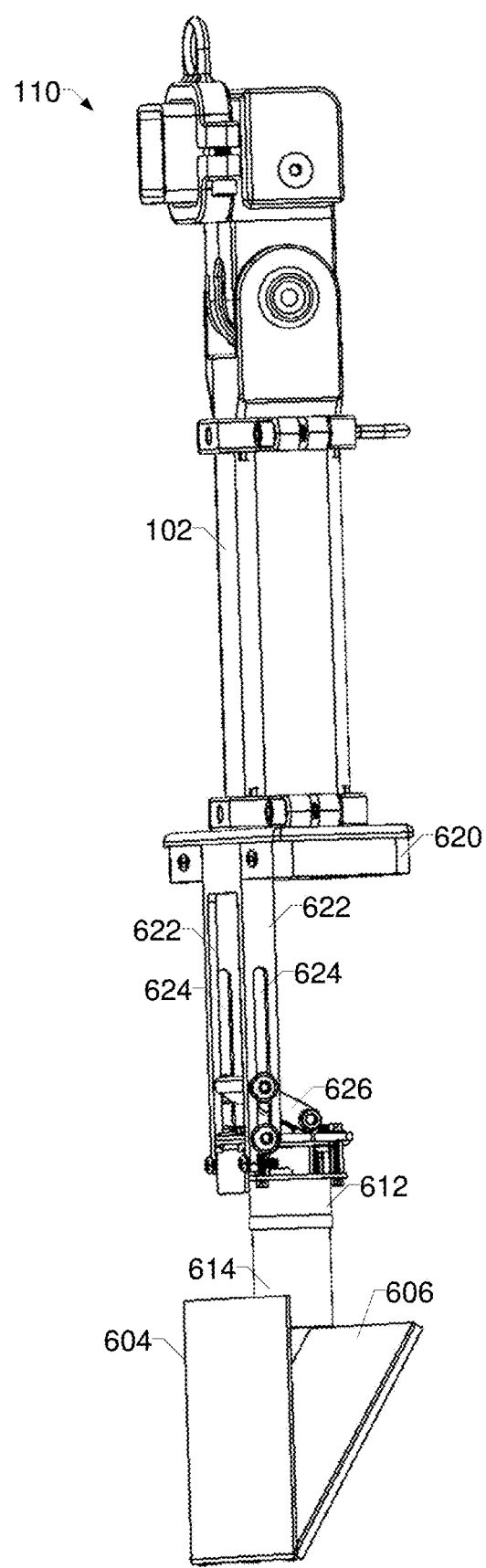
FIG. 7 is a perspective view of a first portion of the handheld X-ray imaging system of FIG. 1, including a digital X-ray detector assembly.

FIG. 6 is a partially exploded view of the example digital X-ray detector 106 of FIG. 1. FIG. 7 is a perspective view of the example digital X-ray detector 106 of FIG. 1. As illustrated in FIG. 6, the X-ray detector 106 includes a detector housing 602, a scintillation screen 604, and a reflector 606. The scintillation screen 604 and the reflector 606 are held within the housing 602 and are illustrated in FIG. 6 to show the relationship between the shape of the housing 602 and the geometries of the scintillation screen 604 and the reflector 606.

The detector housing 602 may be constructed using carbon fiber, aluminum, and/or any other material and/or combination of materials. The example detector housing 602 may function as a soft X-ray filter to reduce undesired X-ray radiation at the scintillation screen 604, thereby reducing noise in the resulting digital image. The scintillation screen 604 and/or the reflector 606 may be attached to the detector housing 602 using adhesive (e.g., epoxy, glue, etc.) and/or any other attachment technique. In some examples, the detector housing 602 is lined with a layer of lead or another backscatter shielding material to lower the dose to the operator in a handheld system.

Figure 8:
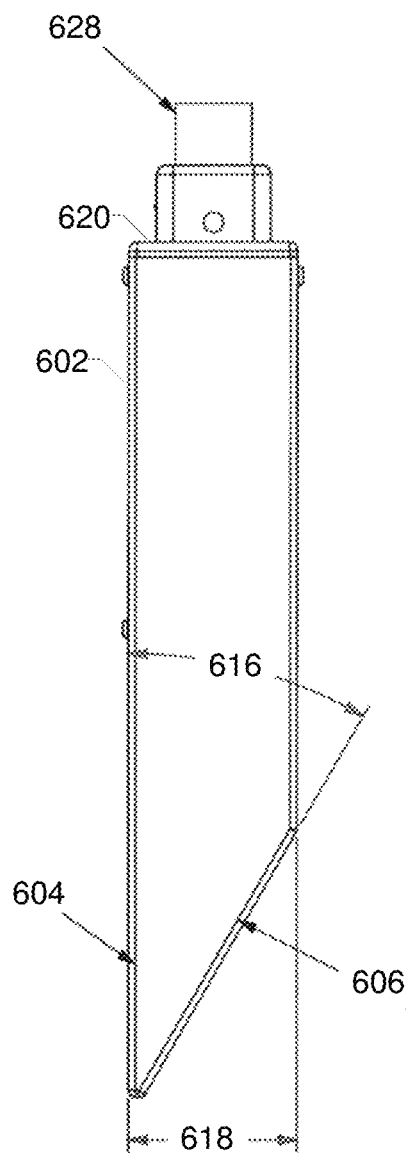
FIG. 8 is a side view of the example digital detector housing, the scintillator, and the reflector.
Figure 9:
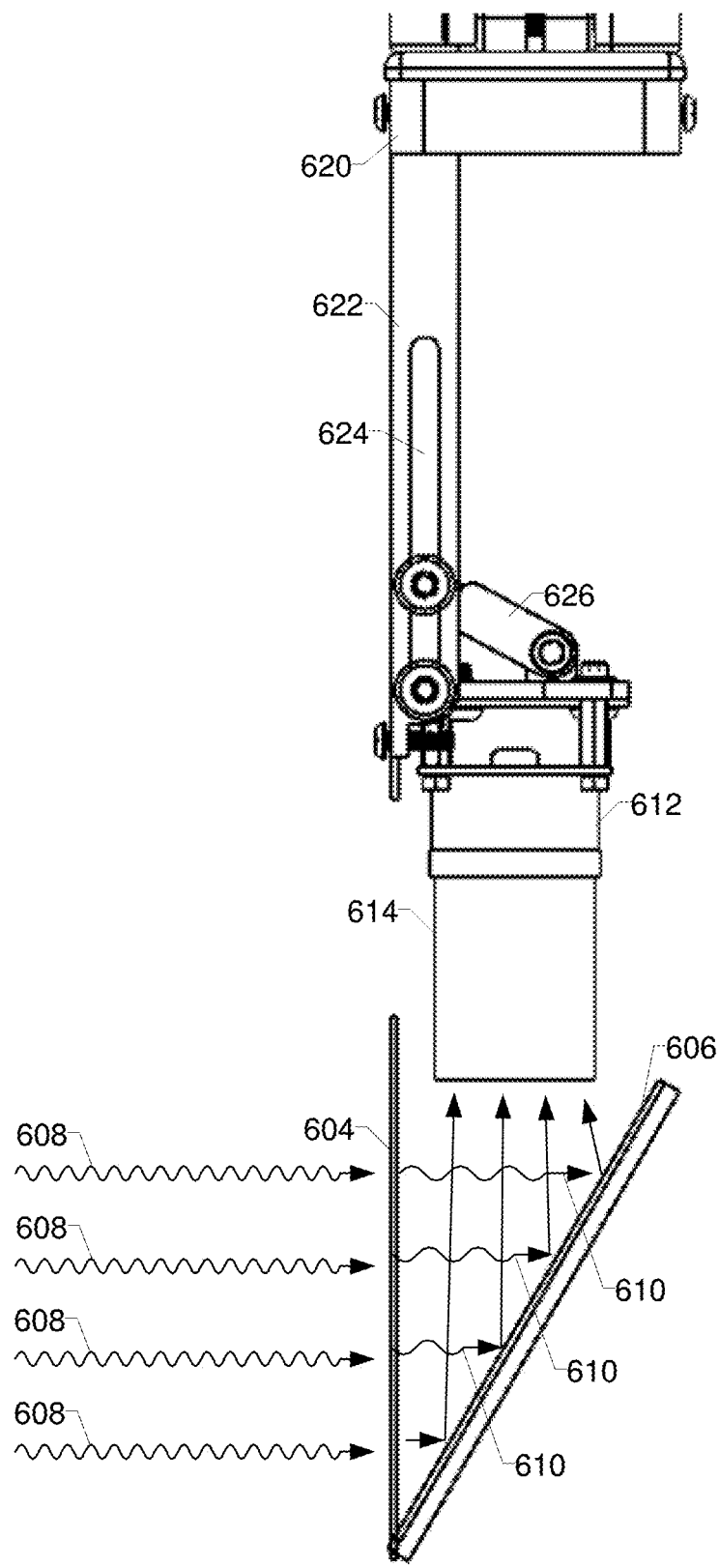
FIG. 9 is a side view of the example digital X-ray detector of FIG. 1, illustrating imaging of incident X-rays by the digital X-ray detector.

FIG. 8 is a side view of the example digital detector housing, the scintillator, and the reflector. FIG. 9 is a side view of the example digital X-ray detector 106 of FIG. 1, illustrating imaging of incident X-rays by the digital X-ray detector. As illustrated in FIG. 9, a digital imaging sensor 612 is oriented to capture light generated by the scintillation screen 604 in response to incident X-ray radiation.

The scintillation screen 604 converts incident X-rays 608 to visible light 610. An example scintillation screen 604 that may be used in a handheld X-ray scanner has a surface area of 4 inches by 6 inches. The size and material of the scintillation screen 604 at least partially determines the size, brightness, and/or resolution of the resulting digital images. The example scintillation screen is Gadox (Gadolinium oxysulphide) doped with Terbium, which emits a peak visible light at a wavelength of substantially 560 nm.

The example reflector 606 is a mirror that reflects visible light generated by the scintillation screen 604 to the digital imaging sensor 612 (e.g., via a lens 614). The example reflector 606 has the same surface area (e.g., 4 inches by 6 inches) as the scintillation screen 604, and is oriented at an angle 616 to direct the visible light 610 to the digital imaging sensor 612 and/or the lens 614. An example angle 616 is 30 degrees, which enables a 4 inch by 6 inch scintillation screen and a 4 inch by 6 inch reflector 606 to fit within a housing having a thickness 618 of less than 2.5 inches. In other examples, the angle 616 is an angle less than 45 degrees.

Other sizes and/or geometries may be used for the scintillation screen 604 and/or the reflector 606. Additionally or alternatively, the digital X-ray detector 106 may include optics such as prisms to direct the visible light 610 to the digital imaging sensor 612.

The example digital imaging sensor 612 is a solid state sensor such as a CMOS camera. In the illustrated example using the scintillation screen 604 and the reflector 606, and a 6 mm lens 614, the digital imaging sensor 612 has a field of view of 143 degrees to capture light from substantially the entirety of the reflector 606.

The digital imaging sensor 612 is coupled to an imager bracket 620 via a mounting brackets 622. The detector housing 602 is also coupled to the imager bracket 620. The imager bracket 620 couples both the detector housing 602 and the digital imaging sensor 612 to the frame 102 of the handheld X-ray imaging system 100.

The mounting brackets 622 includes slots 624 to which an imaging bracket 626 is adjustably coupled. The digital imaging sensor 612 is attached to the imaging bracket 626 (e.g., via a printed circuit board). The imaging bracket 626 may be adjusted and secured along the length of the slots 624 to adjust an angle of the digital imaging sensor 612 relative to the reflector 606. The field of view of the digital imaging sensor 612 is oriented substantially perpendicularly to the scintillation screen, within the angular limits permitted using the slots 624 and the imaging bracket 626.

The example imager bracket 620 may include a data connector 628 (FIG. 8) to enable sufficient data throughput from the digital imaging sensor 612 to a computing device or other image display and/or image storage devices. An example data connector 628 may be a USB 3.0 connector to connect a USB 3.0 bus between the digital imaging sensor 612 and the receiving device. The USB 3.0 bus provides sufficient bandwidth between the digital imaging sensor 612 and the receiving device for high-definition video or better resolution.

While an example implementation of the X-ray detector 106 is described above, other example implementations of the X-ray detector 106 include using a solid state image sensor, such as a CMOS panel or a CCD panel, coupled directly to a scintillator. The CMOS panel produces digital images based on visible light generated by the scintillator, and outputs the digital images to the computing device 304.

Figure 10:
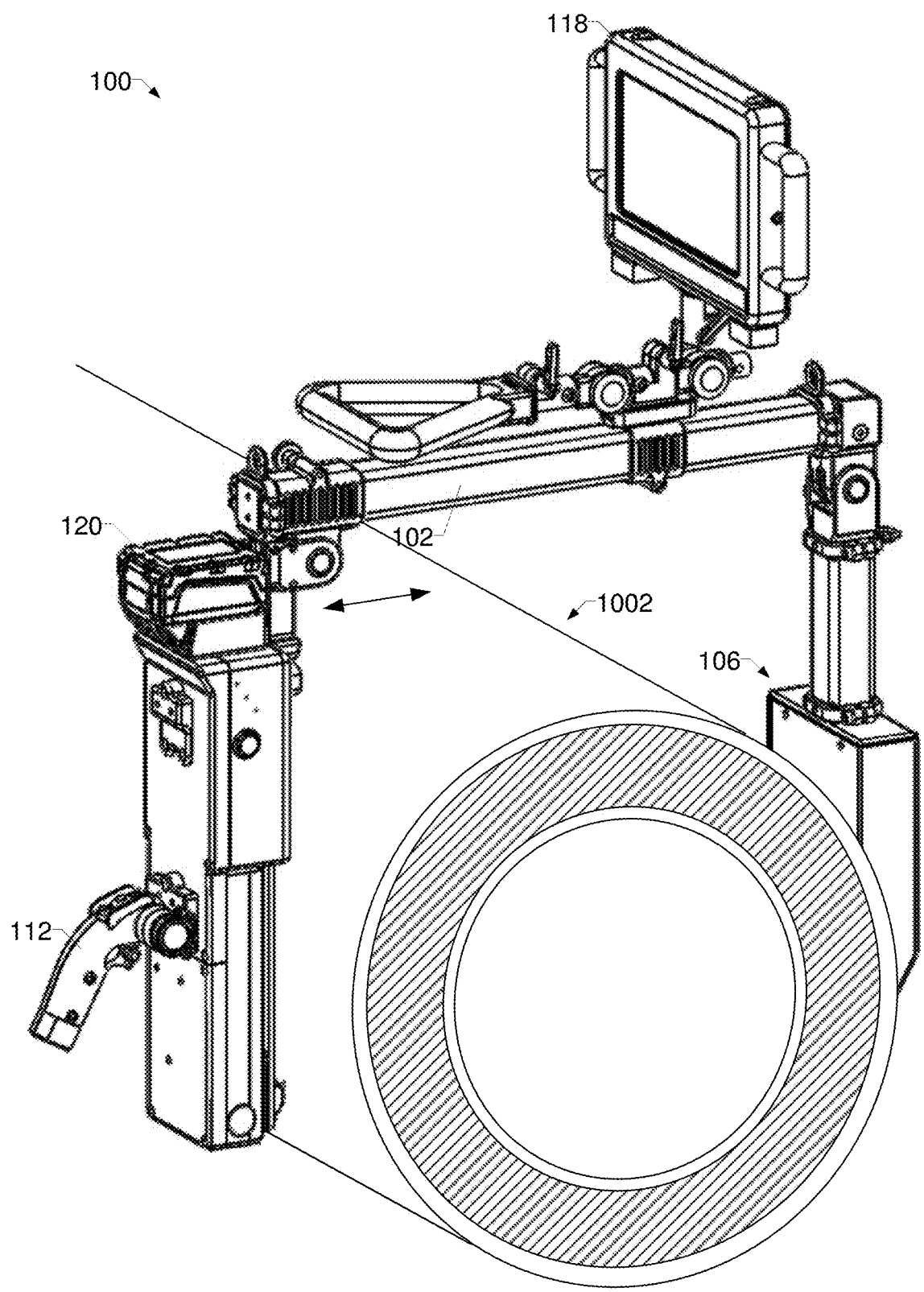
FIG. 10 is a side view of the handheld X-ray imaging system of FIG. 1, illustrating scanning of an object under test by directing X-rays from the X-ray tube to the X-ray detector.

FIG. 10 is a side view of the handheld X-ray imaging system 100 of FIG. 1, illustrating scanning of an object 1002 under test by directing X-rays from the X-ray tube 308 to the X-ray detector 106. As mentioned above, the collimator 310 reduces X-ray radiation that is not directed at the X-ray detector 106, so the concentration of the X-ray radiation that is not scattered by the object 1002 is incident on the X-ray detector 106.

Figure 11:
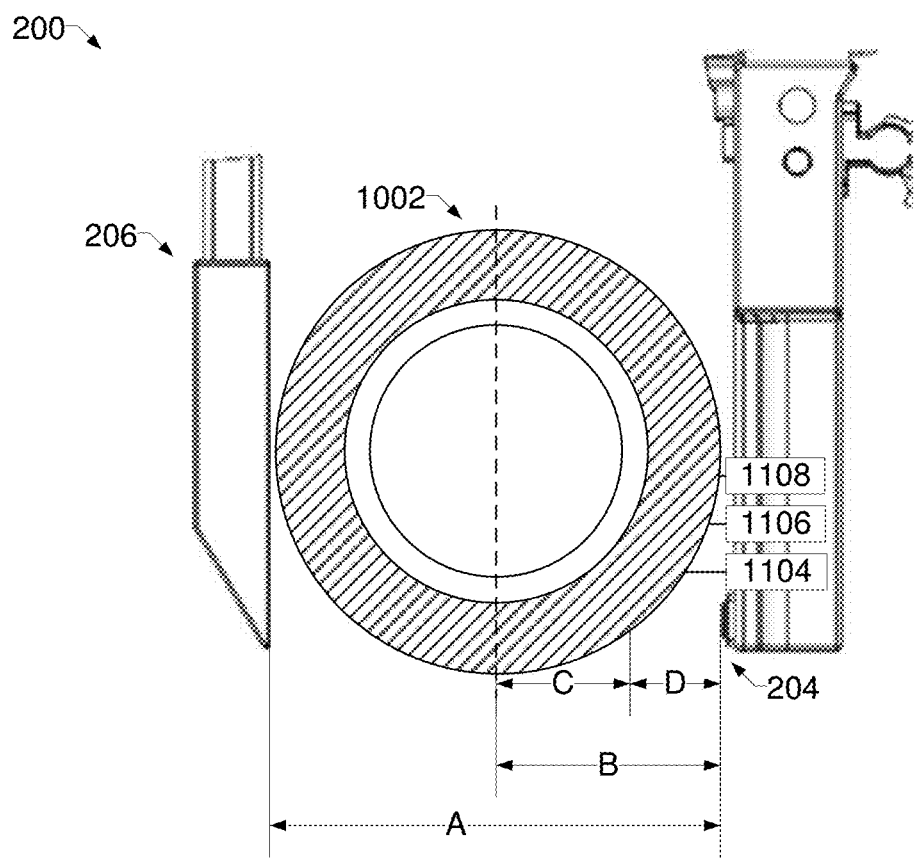
FIG. 11 illustrates an example set of measurements that may be performed by the example handheld X-ray imaging system of FIG. 1 to determine a magnification correction factor.

FIG. 11 illustrates an example set of measurements that may be performed by the example handheld X-ray imaging system 100 of FIG. 1 to determine a magnification correction factor. The magnification correction factor may be used by the example computing device 208 of FIG. 2A to determine, in real-time or subsequently, a size of features identified in digital X-ray images captured via the handheld X-ray imaging system 100. The example of FIG. 11 is described below with reference to the example handheld X-ray imaging system 200 of FIG. 2A, but may be implemented using the example system 250 of FIG. 2B and/or any other implementation of the handheld X-ray imaging system 100.

To determine the magnification correction factor, the example handheld X-ray imaging system 100 determines a first distance A between the X-ray generator 104 and the X-ray detector 106, and a second distance B between the X-ray generator 104 and an interface 1102 between the object (e.g., a pipe) being scanned and the X-ray radiation. While the entirety of the object 1002 may contribute to the resulting digital X-ray image generated via the X-ray detector 106, the interface 1102 may be an observed and/or designated position at which features of interest are present, and/or a location of a focus of the digital image. For example, when scanning pipe under insulation, the locations of potential corrosion in the pipe may be determined as the interface 1102.

To determine the first distance A, the example handheld X-ray imaging system 100 may include a first distance sensor, such as a laser distance sensor, an ultrasonic distance sensor, a light detection and ranging (LIDAR) sensor, and/or any other type of distance sensor. In some examples, the frame 202 has a center section which is extendable and retractable to change the distance between the X-ray generator 204 and the X-ray detector 206. In such examples, the first distance sensor may be positioned on a first side of the frame 202 to measure a distance to the second side of the frame 202. In some other examples, the center section of the frame 202 may include a wire, spring, or other mechanism that extends or retracts based on the distance between the X-ray generator 204 and the X-ray detector 206. The length of extension or retraction of the wire or spring in the center section can be measured by a calibrated sensor to determine the distance between X-ray generator 204 and the X-ray detector 206.

To determine the second distance B, the computing device 208 may receive an input describing the object, which can then be used to determine a distance C between an outer surface of the object 1002 and the interface 1102. Based on the input, for example, the computing device 208 may use a lookup table to determine one or more other dimensions of the object 1002. For example, in the case of an insulated pipe as illustrated in FIG. 11, the outermost diameter of the pipe 1002 (e.g., the outer pipe insulation) may be associated with a certain thickness of insulation and/or a certain outer diameter of the interior pipe. Based on input (e.g., by the operator) of the outer diameter of the pipe 1002, an identifier of the pipe 1002, and/or any other identifying or descriptive information, the computing device 208 looks up one or more additional dimensions and/or factors to be used in calculating a distance between the X-ray generator 204 and the interface 1102.

In addition to the dimensions of the object 1002, the example system 200 of FIG. 11 includes one or more additional distance sensors 1104, 1106 to determine a distance D between the X-ray generator 204 and the outer surface of the object 1002, which is then combined with the dimension(s) of the object 1002 to determine the second distance B. The example distance sensors 1104, 1106 have a predetermined geometric relationship with each other and with the x-ray generator 204, which permits the computing device 208 to perform real-time geometric calculations of the distances C and D to determine the distance B.

In the example of FIG. 11, multiple distance sensors 1104, 1106 are used to both determine the distance between the X-ray generator 204 and the outer surface of the object 1002, and determine a vertical position of the system 200 with respect to the object 1002. For example, as the system 200 is vertically adjusted by the operator, intentionally or unintentionally, the distances measured by the sensors 1104, 1106 also change. Knowing the outer diameter of the object 1002 (e.g., a pipe), as well as an orientation of the system 200 (e.g., the angle of the sensors 1104, 1106 with respect to the object 1002), the example computing device 208 may determine a vertical position of the sensors 1104, 1106 and/or the X-ray generator 204, which determines a distance to be combined with the dimensions of the object 1002 to determine the second distance B.

In some examples, a third sensor 1108 or additional sensor(s) may be added to the sensors 1104, 1106 to further enable the computing device 208 to automatically determine the outer diameter of the object 1002. For example, by determine three distances between the sensors and the object 1002, the computing device 208 may calculate the radius of a pipe using the calculated chord lengths and heights determined using the measured distances to the outer surface and the known vertical relationships between the sensors 1104-1108, which can then be used to look up the thickness of insulation, diameter of the inner pipe, and/or any other geometric information. The sensor(s) 1104-1108 may implement the sensor(s) 236 of FIGS. 2A-2B. The example sensors 1104-1108 may be any type of distance sensor, such as a laser distance sensor, an ultrasonic distance sensor, a light detection and ranging (LIDAR) sensor, and/or any other type of distance sensor.

In some examples, one or more of the sensors 1104-1108 may be used to measure the distance A when there are no obstructions between the different sections of the frame 202 (or different frame sections 252, 254. The positions of the sensor 1104 and the frame 202 with respect to the X-ray tube 218 and/or the X-ray detector 206 may be calibrated to determine any offsets for determining the distance A.

Using the measured first distance A and the determined second distance B, the example computing device 208 calculates a magnification correction factor. For example, the magnification may be determined as the ratio of the first distance A to the second distance B.

Figure 12:
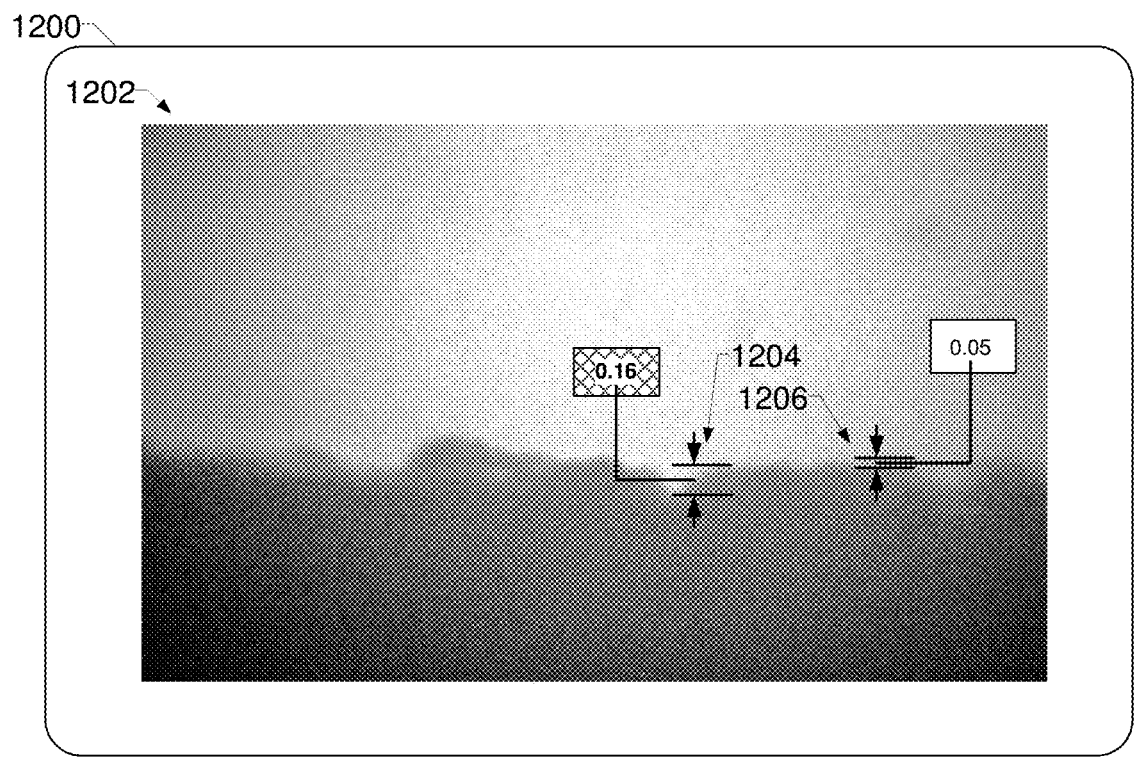
FIG. 12 illustrates an example display device configured to display digital X-ray images and indications of feature sizes detected by the handheld X-ray imaging system using the magnification correction factor.

FIG. 12 illustrates an example display device 1200 configured to display digital X-ray images 1202 and including features 1204, 1206, showing indications of feature sizes detected by the handheld X-ray imaging system 200 using the magnification correction factor. The display device 1200 of FIG. 12 shows an example image 1202 captured by the X-ray detector 206. The image 1202 may be captured, for example, while scanning a pipe under insulation for internal corrosion using the system 200.

To generate the image 1202, the computing device 208 controls the X-ray generator 204 to output the X-ray radiation directed at the X-ray detector 206 (e.g., in response to an operator input device 214 such as a trigger, button, or other input). The X-ray detector 206 outputs to the computing device 208, in real-time, a digital image representative of the incident X-ray radiation. The digital X-ray detector 206 may continue outputting digital X-ray images and/or video to the computing device 208, which displays the images via the display device 1200 (e.g., the display device(s) 212 of FIG. 2A).

In conjunction with outputting the digital X-ray image 1202, the computing device 208 determines a magnification correction factor based on a first distance (e.g., the distance A of FIG. 11) between the X-ray detector 206 and the X-ray generator 204 and based on a second distance (e.g., the distance B) between the X-ray generator 204 and the interface (e.g., the interface 1102 of FIG. 11) between the X-ray radiation and the object 1002. The computing device 208 may determine the magnification correction factor based on any of the example techniques discussed above with reference to FIG. 11. Because the distance A does not typically change during a scanning operation, the computing device 208 may monitor and update the magnification correction factor (e.g., in real-time) based on monitoring changes in the measurements by one or more of the sensor(s) 1104-1108 and/or based on orientation sensors such as gyroscopes and/or accelerometers in the system 200.

The computing device 208 may analyze the captured digital X-ray images using one or more machine vision techniques to identify features of interest in the digital X-ray images. The computing device 208 may be configured to identify features based on the particular applications for which the system 200 is being used. In the example of FIG. 12, the computing device 208 is configured to identify peaks and valleys in the digital image that could indicate the presence of corrosion within pipe under insulation. Once identified, the example computing device 208 measures a size, in pixels, of the identified feature(s) in the digital X-ray image 1202 using appropriate machine vision techniques. For example, the example features 1204, 1206 may be analyzed by the computing device 208 to determine respective heights, in pixels, of the features 1204, 1206. In some examples, the features 1204, 1206 are selected by the operator by, for example, defining the feature using a touchscreen or other input device.

Using the magnification correction factor, the computing device 208 converts the pixel sizes to an actual size (e.g., in millimeters or other unit). For example, using the predetermined and fixed pixel pitch of the X-ray detector 206, the computing device 208 may scale the number of pixels to an actual size using the pixel pitch and the magnification correction factor to calculate one or more actual dimensions of the features 1204, 1206. As used herein, the term "pixel pitch" refers to the physical distance separating the center of the physical area (e.g., on the scintillation screen) captured by adjacent pixels in an image sensor or camera. A smaller pixel pitch (e.g., higher resolution, smaller distance between portions of the image captured by adjacent pixels) may result in improved measurements, but may require enhanced bandwidth between the X-ray detector 206 and the computing device 208, and/or enhanced processing power at the computing device 208.

Additionally or alternatively, the computing device 208 may compare the sizes of the features, in pixels or millimeters (or other unit), with a corresponding threshold size. For example, a threshold feature size may be input by the operator and/or automatically determined based on one or more factors (e.g., object size, object type, feature type, etc.). The threshold feature size may be specified in actual units (e.g., millimeters or other unit), which may be converted to a pixel size based on the pixel pitch and the magnification correction factor.

In the example of FIG. 12, the feature 1204 has a dimension that is greater than the threshold size, and the feature 1206 has a dimension that is less than the threshold size. In some examples, the threshold size is selected or input to indicate a potential flaw in the object. The computing device 208 overlays the calculated sizes of the features 1204, 1206 over the digital X-ray image 1202 on the display 1200, as well as a visual indication of the comparison between the feature size and the threshold size. For example, the visual indication may be a color coding scheme, further overlay (e.g., a circle or other shape overlaid over the feature), modification to the font of the size overlay, and/or any other visual technique. In the example of FIG. 12, the feature 1204 is highlighted as a different color than the feature 1206.

In some examples, the computing device 208 calculates and overlays a nominal image of the object over the digital image 1202. For example, the computing device 208 may identify a prior scan or other representation of the object 1002 as a "digital twin" of the object for visual comparison in real-time by the operator during the scanning operation. The computing device 208 may use the magnification correction factor and/or other sensor data (e.g., accelerometer and/or gyroscope data related to orientation of the scanning system 200) to calculate an overlay location of the digital twin on the display 1200 to align with the captured digital image 1202.

Figure 13:
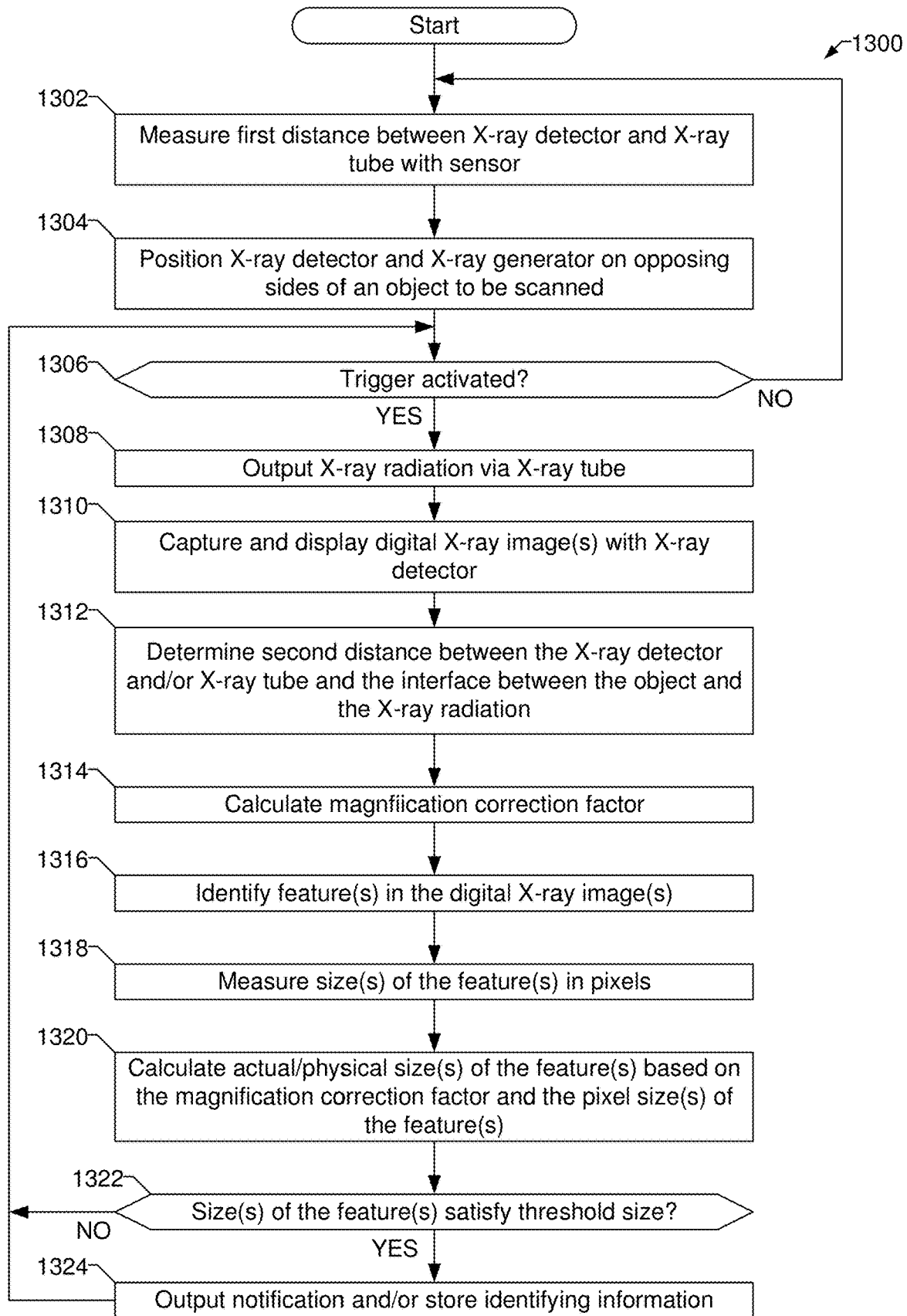
FIG. 13 is a flowchart representative of example machine readable instructions which may be executed by the example handheld X-ray imaging system of FIGS. 1, 2A, and/or 2B to determine and display, on a display device, size(s) of features in digital X-ray images captured by the handheld X-ray imaging system.

FIG. 13 is a flowchart representative of example machine readable instructions 1300 which may be executed by the example handheld X-ray imaging systems 100, 200, 250 of FIGS. 1, 2A, and/or 2B to determine and display, on a display device, size(s) of features in digital X-ray images captured by the handheld X-ray imaging system. The example instructions 1300 are described below with reference to the example system 200 of FIG. 2A and the examples of FIGS. 11 and 12.

At block 1302, the computing device 208 measures a first distance A between the X-ray detector 206 and the X-ray generator 204 using a sensor (e.g., the sensors 1104-1108 or other sensor).

At block 1304, an operator of the system 200 positions the X-ray detector 206 and the X-ray generator 204 on opposing sides of an object to be scanned (e.g., the object 1002). The operator further positions the X-ray detector 206 and the X-ray generator 204 such that the X-ray generator 204 directs X-ray radiation at the X-ray detector 206.

At block 1306, the computing system 208 determines whether the trigger is activated. For example, the operator may actuate the X-ray trigger 312 of FIG. 3 to activate output of X-rays. If the trigger is not activated (block 1306), control returns to block 1302 to continue to monitor the distance A between the X-ray detector 206 and the X-ray generator 204 and/or position the system 200.

When the trigger is not activated (block 1306), at block 1308 the computing system 208 controls the X-ray generator 204 to output X-ray radiation. At block 1310, the X-ray detector 206 generates one or more digital X-ray image(s) based on the X-ray radiation, which has traversed the object 1002, and the computing device 208 outputs the digital X-ray image(s) via the display device 1200.

At block 1312, the computing system 208 determines a second distance B between the X-ray generator 204 and an interface (e.g., the interface 1102) between the output radiation and the object being scanned. For example, the computing system 208 may use an input dimension and/or identifier of the object to determine one or more internal dimensions (e.g., the distance C of FIG. 11) of the object 1002, and/or use one or more sensor(s) 1104-1108 to determine a distance (e.g., the distance D of FIG. 11) between the X-ray generator 204 and an exterior surface of the object 1002. However, any of the example techniques disclosed herein, or any other technique, may be used to determine the second distance B.

At block 1314, the computing device 208 calculates a magnification correction factor. The magnification correction factor may be based on the first distance A and the second distance B. In some examples, the magnification correction factor may further take into account the pixel pitch of the X-ray detector 206 to reduce subsequent calculation.

At block 1316, the computing device 208 identifies feature(s) in the digital X-ray image(s). For example, the computing device 208 may use one or more machine vision techniques to identify features of interest based on the scanning application.

At block 1318, the computing device 208 measures the size(s) of the identified feature(s) in pixels. For example, the computing device 208 may measure one or more dimensions of the identified feature(s) in pixels.

At block 1320, the computing device 208 calculates actual or physical size(s) of the feature(s) using the magnification correction factor and the measured sizes of the feature(s) in pixels.

At block 1322, the computing device 208 determines whether the size(s) of the feature(s) satisfy a size threshold. In some examples, the size threshold may be in physical units (e.g., millimeters, etc.), or the computing device 208 may convert the size threshold to a pixel-based threshold based on the magnification correction factor, to reduce the number of feature sizes and/or dimensions that are converted to physical or actual sizes.

If the size(s) of one or more of the feature(s) satisfy the size threshold (block 1322), at block 1324 the computing device 208 outputs a notification and/or stores the identifying information of the feature(s). For example, the computing device 208 may overlay the feature(s) on the display device 1200 over the digital X-ray image 1202, output an audible and/or visual notification of the identified feature, transmit a notification to one or more external computing device, and/or store the identification and/or location of the feature(s) in association with the digital X-ray image(s) and/or video(s) in which the feature was identified. For example, in a real-time scanning application, the same feature(s) that satisfy the size threshold may be present in multiple image(s) and/or frame(s) of a video.

After outputting and/or storing the notification (block 1324), or if the size(s) of one or more of the feature(s) do not satisfy the size threshold (block 1322), control returns to block 1306 to continue the scanning operation while the trigger is activated.

While the examples disclosed above are discussed with reference to the computing device 208 of the system 200, in other examples one or more blocks performed by the computing device 208 may be performed by an external computing device, such as a cloud computing system, by communicating the associated data to the external computing system using communications circuitry of the computing device 208. In some such examples, the computing system 208 receives a result of the processing (e.g., identification and location of features, whether the features satisfy a size threshold, etc.) from the external computing system.

Figure 14:
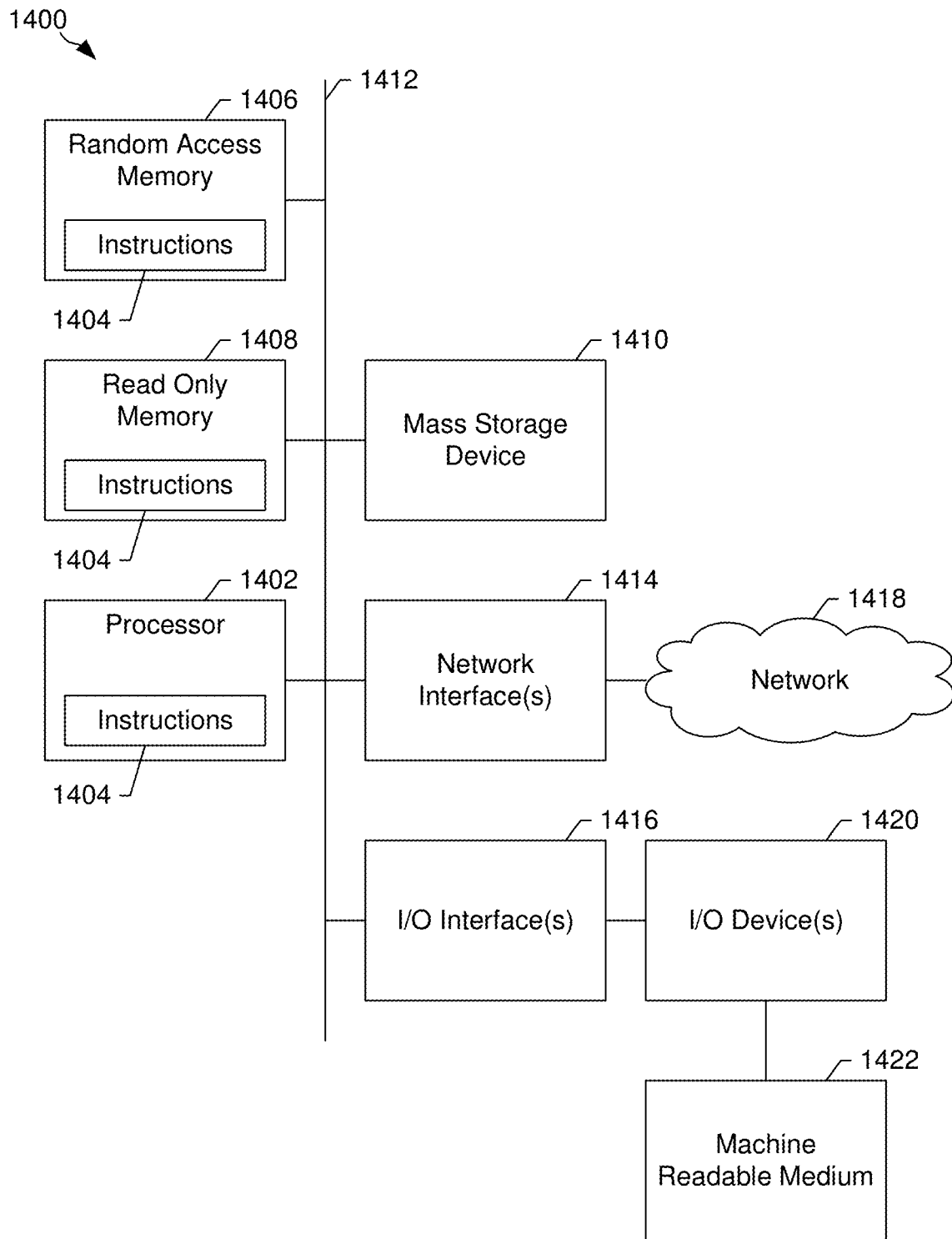
FIG. 14 is a block diagram of an example computing system that may be used to implement the computing device and/or the display devices of FIG. 2A or 2B.

FIG. 14 is a block diagram of an example computing system 1400 that may be used to implement either or both of the computing devices 208, 208a, 208b and/or the display device(s) 212 of FIGS. 2A and/or 2B. The example computing system 1400 may be implemented using a personal computer, a server, a smartphone, a laptop computer, a workstation, a tablet computer, and/or any other type of computing device.

The example computing system 1400 of FIG. 14 includes a processor 1402. The example processor 1402 may be any general purpose central processing unit (CPU) from any manufacturer. In some other examples, the processor 1402 may include one or more specialized processing units, such as RISC processors with an ARM core, graphic processing units, digital signal processors, and/or system-on-chips (SoC). The processor 1402 executes machine readable instructions 1404 that may be stored locally at the processor (e.g., in an included cache or SoC), in a random access memory 1406 (or other volatile memory), in a read only memory 1408 (or other non-volatile memory such as FLASH memory), and/or in a mass storage device 1410. The example mass storage device 1410 may be a hard drive, a solid state storage drive, a hybrid drive, a RAID array, and/or any other mass data storage device.

A bus 1412 enables communications between the processor 1402, the RAM 1406, the ROM 1408, the mass storage device 1410, a network interface 1414, and/or an input/output interface 1416.

The example network interface 1414 includes hardware, firmware, and/or software to connect the computing system 1400 to a communications network 1418 such as the Internet. For example, the network interface 1414 may include IEEE 802.X-compliant wireless and/or wired communications hardware for transmitting and/or receiving communications.

The example I/O interface 1416 of FIG. 14 includes hardware, firmware, and/or software to connect one or more input/output devices 1420 to the processor 1402 for providing input to the processor 1402 and/or providing output from the processor 1402. For example, the I/O interface 1416 may include a graphics processing unit for interfacing with a display device, a universal serial bus port for interfacing with one or more USB-compliant devices, a FireWire, a field bus, and/or any other type of interface. Example I/O device(s) 1420 may include a keyboard, a keypad, a mouse, a trackball, a pointing device, a microphone, an audio speaker, an optical media drive, a multi-touch touch screen, a gesture recognition interface, a display device (e.g., the display device(s) 118, 212, 1200) a magnetic media drive, and/or any other type of input and/or output device.

The example computing system 1400 may access a non-transitory machine readable medium 1422 via the I/O interface 1416 and/or the I/O device(s) 1420. Examples of the machine readable medium 1422 of FIG. 14 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Example wireless interfaces, protocols, and/or standards that may be supported and/or used by the network interface(s) 1414 and/or the I/O interface(s) 1416, such as to communicate with the display device(s) 212, include wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB); etc. Example wired interfaces, protocols, and/or standards that may be supported and/or used by the network interface(s) 1414 and/or the I/O interface(s) 1416, such as to communicate with the display device(s) 212, include comprise Ethernet (IEEE 802.3), Fiber Distributed Data Interface (FDDI), Integrated Services Digital Network (ISDN), cable television and/or internet (ATSC, DVB-C, DOCSIS), Universal Serial Bus (USB) based interfaces, etc.

The processor 1402, the network interface(s) 1414, and/or the I/O interface(s) 1416, and/or the display device 212, may perform signal processing operations such as, for example, filtering, amplification, analog-to-digital conversion and/or digital-to-analog conversion, up-conversion/down-conversion of baseband signals, encoding/decoding, encryption/decryption, modulation/demodulation, and/or any other appropriate signal processing.

The computing device 208 and/or the display device 212 may use one or more antennas for wireless communications and/or one or more wired port(s) for wired communications. The antenna(s) may be any type of antenna (e.g., directional antennas, omnidirectional antennas, multi-input multi-output (MIMO) antennas, etc.) suited for the frequencies, power levels, diversity, and/or other parameters required for the wireless interfaces and/or protocols used to communicate. The port(s) may include any type of connectors suited for the communications over wired interfaces/protocols supported by the computing device 208 and/or the display device 212. For example, the port(s) may include an Ethernet over twisted pair port, a USB port, an HDMI port, a passive optical network (PON) port, and/or any other suitable port for interfacing with a wired or optical cable.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A portable radiography scanning system, comprising:
   a radiation detector configured to generate a digital image based on incident radiation;
   a radiation emitter configured to output the radiation;
   a frame configured to hold at least one of the radiation emitter or the radiation detector such that the radiation emitter directs the radiation to the radiation detector;
   a first sensor configured to determine a first distance between the radiation detector and the radiation emitter; and
   a computing device configured to:
      determine a second distance between the radiation emitter and an interface between the radiation and the object by:
         measuring a third distance between the radiation emitter and a first location on an outer surface of the object via a second sensor;
         measuring a fourth distance between the radiation emitter and a second location on the outer surface of the object via a third sensor; and
         determining the second distance based on the third distance and the fourth distance;
      determine a magnification correction factor based on the first distance and the second distance;
      measure a size, in pixels, of a feature of the object in the digital image; and
      at least one of: calculate an actual size of the feature based on the magnification correction factor and the measured size of the feature, or determine whether the measured size of the feature satisfies a threshold size based on the magnification correction factor.

2. The portable radiography scanning system as defined in claim 1, further comprising a display configured to display the digital image.

3. The portable radiography scanning system as defined in claim 2, wherein the computing device is configured to control the display to overlay an indication of the measured feature in the digital image and the calculated actual size of the feature over the digital image on the display.

4. The portable radiography scanning system as defined in claim 3, wherein the computing device is configured to control the display to display an indication of whether the calculated actual size of the feature satisfies a threshold.

5. The portable radiography scanning system as defined in claim 4, wherein the threshold size is input by an operator.

6. The portable radiography scanning system as defined in claim 2, wherein the computing device is configured to output a notification in response to determining that the size of the feature satisfies the threshold size.

7. The portable radiography scanning system as defined in claim 2, wherein the computing device is configured to, in response to determining that the size of the feature satisfies the threshold size, store location information at which the digital image was captured in association with the digital image.

8. The portable radiography scanning system as defined in claim 2, wherein the computing device is configured to calculate and overlay a nominal image of the object on the display over the digital image.

9. The portable radiography scanning system as defined in claim 1, wherein the first sensor comprises at least one of a laser distance sensor, an ultrasonic distance sensor, or a light detection and ranging (LIDAR) sensor.

10. The portable radiography scanning system as defined in claim 1, wherein the computing device is configured to determine the second distance by accessing a lookup table based on at least one dimension of the object.

11. The portable radiography scanning system as defined in claim 1, wherein the frame holds the radiation detector on a first section of the frame and holds the radiation emitter on a second section of the frame.

12. The portable radiography scanning system as defined in claim 11, wherein a center section of the frame is adjustable to adjust a distance between the first section of the frame and the second section of the frame based on the size of the object, so as to adjust a distance between the radiation detector and the radiation emitter.

13. The portable radiography scanning system as defined in claim 1, wherein the computing device is configured to perform a computer analysis of the digital image, based on the magnification correction factor and the measured size of the feature, to determine whether the feature is indicative of a flaw in the object.

14. The portable radiography scanning system as defined in claim 1, wherein the computing device is configured to receive an input identifying the feature to be measured in the digital image.

15. The portable radiography scanning system as defined in claim 1, wherein the computing device is configured to: update the second distance based on changes in at least one of the third distance or the fourth distance; and update the magnification correction factor based on the updated second distance.

16. A method to calculate a dimension of a feature of an object scanned via an X-ray image, the method comprising:
   positioning an X-ray detector on a first side of an object to be scanned;
   positioning an X-ray tube on a second side of the object such that the X-ray tube directs X-ray radiation at the X-ray detector through the object;
   measuring, via a first sensor, a first distance between the X-ray detector and the X-ray tube;
   determining a second distance between the X-ray emitter and an interface between the X-ray radiation and the object by:
      measuring a third distance between the radiation emitter and a first location on an outer surface of the object via a second sensor;
      measuring a fourth distance between the radiation emitter and a second location on the outer surface of the object via a third sensor; and
      determining the second distance based on the third distance and the fourth distance;
   determining a magnification correction factor based on the first distance and the second distance;
   capturing, via the X-ray detector, a digital X-ray image of the object;

measuring a size, in pixels, of a feature of the object in the digital X-ray image; and at least one of: calculating an actual size of the feature based on the magnification correction factor and the measured size of the feature, or determining whether the measured sized of the feature satisfies a threshold size based on the magnification correction factor.

17. The method as defined in claim 16, further comprising displaying the digital X-ray image on a display.

18. The method as defined in claim 17, further comprising overlaying the digital X-ray image on the display with an indication of the measured feature in the digital X-ray image and the calculated actual size of the feature.

19. The method as defined in claim 18, further comprising displaying an indication of whether the calculated actual size of the feature satisfies the threshold size.

* * * * *